(12) United States Patent
Chamon et al.

(10) Patent No.: US 11,978,021 B2
(45) Date of Patent: May 7, 2024

(54) VEHICLE SCHEDULE ASSISTANT

(71) Applicant: FORD GLOBAL TECHNOLOGIES, LLC, Dearborn, MI (US)

(72) Inventors: Lucas Chamon, Salvador (BR); Debora Lima, Salvador (BR); Larissa Souza, Camacari (BR); Leonardo Botasoli, Lauro de Freitas (BR)

(73) Assignee: Ford Global Technologies, LLC, Dearborn, MI (US)

( * ) Notice: Subject to any disclaimer, the term of this patent is extended or adjusted under 35 U.S.C. 154(b) by 676 days.

(21) Appl. No.: 16/252,926

(22) Filed: Jan. 21, 2019

(65) Prior Publication Data
US 2020/0234249 A1 Jul. 23, 2020

(51) Int. Cl.
G06Q 10/1093 (2023.01)
G07C 5/00 (2006.01)

(52) U.S. Cl.
CPC ......... G06Q 10/1095 (2013.01); G07C 5/008 (2013.01)

(58) Field of Classification Search
CPC .......... G06Q 10/1095; G06Q 20/3224; G06Q 10/06314; G07C 5/008; H04W 4/029
See application file for complete search history.

(56) References Cited

U.S. PATENT DOCUMENTS

| | | | |
|---|---|---|---|
| 8,166,178 B2 * | 4/2012 | Horvitz | H04L 67/2819 709/227 |
| 8,386,929 B2 | 2/2013 | Zaika et al. | |
| 8,402,148 B2 * | 3/2013 | Horvitz | H04L 67/30 709/228 |
| 8,442,758 B1 | 5/2013 | Rovik et al. | |
| 9,190,075 B1 | 11/2015 | Cronin | |
| 9,355,368 B2 | 5/2016 | Djugash | |
| 9,520,006 B1 * | 12/2016 | Sankovsky | G07C 5/02 |
| 2014/0136443 A1 * | 5/2014 | Kinsey, II | G06Q 30/0631 705/347 |
| 2015/0302667 A1 * | 10/2015 | Punjabi | G07C 5/008 701/31.4 |
| 2016/0225198 A1 * | 8/2016 | Punjabi | G07C 5/008 |
| 2017/0200449 A1 * | 7/2017 | Penilla | G10L 15/063 |
| 2017/0352082 A1 * | 12/2017 | Aziz | G06Q 30/0278 |
| 2018/0060742 A1 * | 3/2018 | Penilla | H04L 67/12 |
| 2018/0285827 A1 * | 10/2018 | Dotan-Cohen | G06Q 10/063 |

FOREIGN PATENT DOCUMENTS

JP 2003248647 A * 8/2003 ............. G06Q 10/00

OTHER PUBLICATIONS

Ravenscraft, Eric, "How to Get an Automatic Reminder to Fill Up Your Car's Gas Tank When It's Low," How-To Geek, May 2, 2017.

* cited by examiner

*Primary Examiner* — Rutao Wu
*Assistant Examiner* — Stephen S Swartz
(74) *Attorney, Agent, or Firm* — Joseph Zane; Brooks Kushman P.C.

(57) ABSTRACT

A system includes a transceiver and a processor. The processor is programmed to receive, using the transceiver, information from a vehicle indicative of vehicle status and from a cloud service indicative of a user schedule, and responsive to occurrence of a predefined trigger event determined according to the information, identify a responsive action to update the user schedule corresponding to the trigger event and notify a user of the action in accordance with a degree of freedom setting.

17 Claims, 3 Drawing Sheets

VEHICLE SCHEDULE ASSISTANT

TECHNICAL FIELD

Aspects of the disclosure generally relate to a vehicle schedule assistant.

BACKGROUND

A user leaving a home under a tight schedule to an important commitment may face a vehicle with an empty fuel tank and a lack of sufficient time to reach a destination if the user stops at a gas station. Or, the user may wake to find the vehicle has a flat tire. These and other vehicle-related needs can be unpredictable or unavoidable, yet they need to be addressed, causing annoyance to the user and jeopardy to their calendar.

SUMMARY

In one or more illustrative examples, a system includes a transceiver and a processor. The processor is programmed to receive, using the transceiver, information from a vehicle indicative of vehicle status and from a cloud service indicative of a user schedule, and responsive to occurrence of a predefined trigger event determined according to the information, identify a responsive action to update the user schedule corresponding to the trigger event and notify a user of the action in accordance with a degree of freedom setting.

In one or more illustrative examples, a method includes configuring trigger events with triggering statuses and responsive actions. The method further includes, responsive to occurrence of one of the trigger events determined according to information from a vehicle or a cloud service meeting one of the triggering statuses, identifying a responsive action to update a user schedule corresponding to the one of the trigger events and notifying a user of the action in accordance with a degree of freedom setting of the user.

In one or more illustrative examples, a non-transitory computer-readable medium comprising instructions of a schedule application that, when executed by a processor of a mobile device, cause the mobile device to receive, using a transceiver of the mobile device, information from a vehicle indicative of vehicle status and from a cloud service indicative of a user schedule, and responsive to occurrence of a predefined trigger event determined according to the information, identify a responsive action to update the user schedule corresponding to the trigger event and notify a user of the action in accordance with a degree of freedom setting.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A user may install a schedule assistant application to a mobile device that integrates with connected vehicles, scheduling applications, and personal task managers in an active manner. Vehicle information may be made available to the schedule assistant application from the connected vehicles. Using the information, the schedule assistant application may be programmed to integrate with the personal task manager or calendar to automatically generate new tasks, and/or set and modify alarms and reminders. In an example, the schedule assistant application may be programmed to generate tasks with alarms prior to the user's next commitment, or pull ahead wake-up alarms to give the user headroom to perform a detected urgent vehicle-related task avoiding major impacts due to the unpredictable issues such as flat tires, low fuel, low battery voltage, etc. The schedule assistant application may also be programmed to check traffic data to warn the user proactively to ensure that the user has sufficient time to plan for the event.

Additionally, a level of freedom could be customized to allow the schedule assistant application to act in an independent mode in which the application automatically makes adjustments to the user's schedule, or in a confirmation mode in which the schedule assistant application requests confirmation of various actions from the user. Moreover, the schedule assistant application may be configurable to allow the user to select which events would activate operation of the schedule assistant application. Further aspects of the disclosure are discussed in detail herein.

Figure 1:
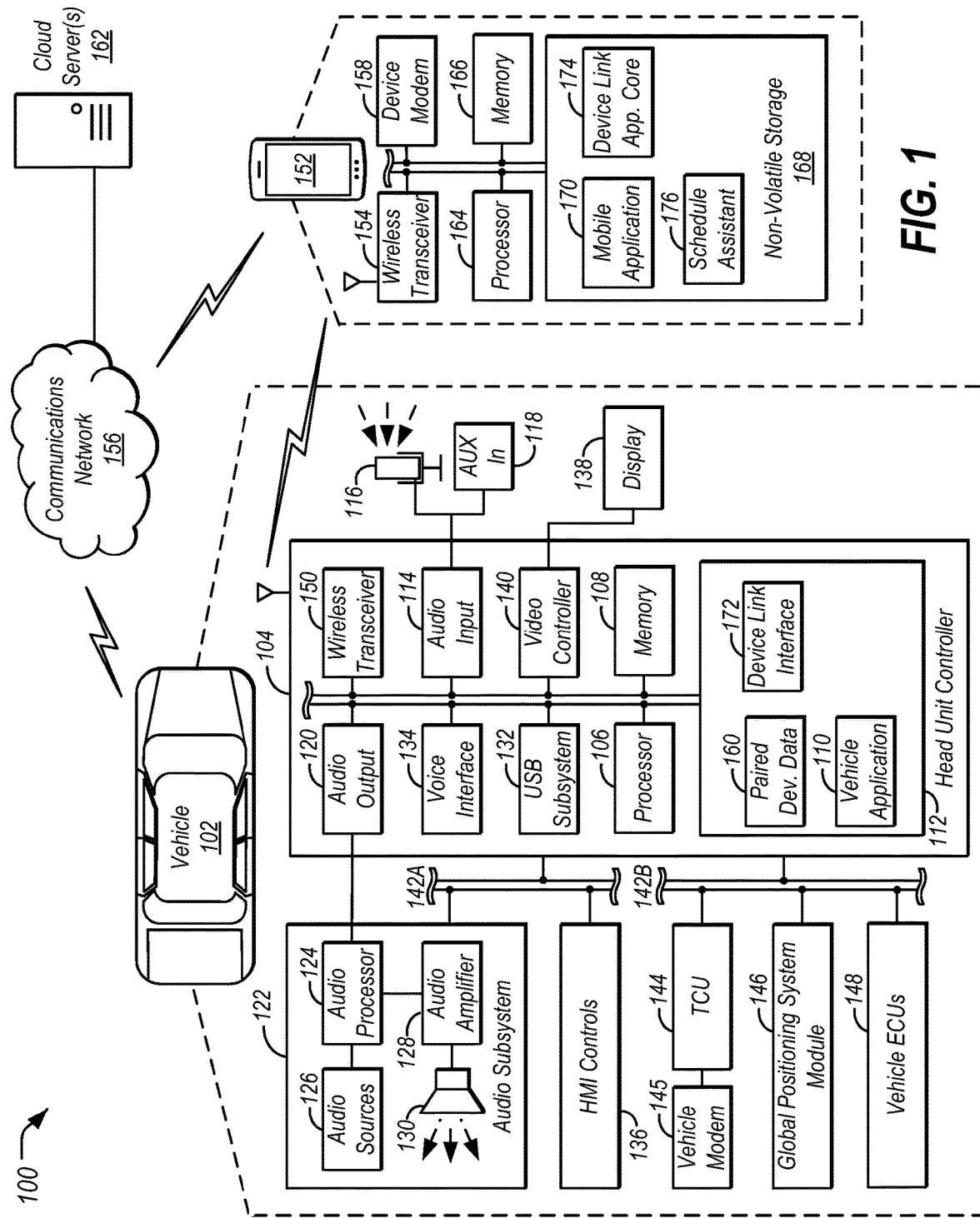
FIG. 1 illustrates an example diagram of a system configured to provide vehicle schedule assistant services to a vehicle.

FIG. 1 illustrates an example diagram of a system 100 configured to provide vehicle scheduling assistant services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Michigan. It should be noted that the illustrated system 100 is merely an example, and more, fewer, and/or differently located elements may be used.

A head unit controller 104 may include one or more memories 108 and one or more processors 106 configured to perform instructions, commands, and other routines in support of the processes described herein. For instance, the head unit controller 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the head unit controller 104. Computer-executable instructions may be compiled or interpreted from computer programs created using a variety of programming languages and/or technologies, including, without limitation, and either alone or in combination, JAVA, C, C++, C #, OBJECTIVE C, FORTRAN, PASCAL, JAVA SCRIPT, PYTHON, PERL, and PL/SQL.

The head unit controller 104 may be provided with various features allowing the vehicle occupants to interface with the head unit controller 104. For example, the head unit controller 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The head unit controller 104 may also provide one or more audio outputs 120 to an input of an audio module 122 having audio playback functionality. In other examples, the head unit controller 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio module 122 may include an audio processor 124 configured to perform various operations on audio content received from a selected audio source 126 and to platform audio received from the audio output 120 of the head unit controller 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the head unit controller 104, such as audio content generated by the head unit controller 104, audio content decoded from flash memory drives connected to a universal serial bus (USB) subsystem 132 of the head unit controller 104, and audio content passed through the head unit controller 104 from the auxiliary audio input 118. For instance, the audio sources 126 may also include Wi-Fi streamed audio, USB streamed audio, BLUETOOTH streamed audio, internet streamed audio, TV audio, as some other examples.

The head unit controller 104 may utilize a voice interface 134 to provide a hands-free interface to the head unit controller 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the head unit controller 104 and another audio source 126 is selected for playback.

The microphone 116 may also be used by the head unit controller 104 to detect the presence of in-cabin conversations between vehicle occupants. In an example, the head unit controller 104 may perform speech activity detection by filtering audio samples received from the microphone 116 to a frequency range in which first formants of speech are typically located (e.g., between 240 and 2400 HZ), and then applying the results to a classification algorithm configured to classify the samples as either speech or non-speech. The classification algorithm may utilize various types of artificial intelligence algorithm, such as pattern matching classifiers, K nearest neighbor classifiers, as some examples.

The head unit controller 104 may also receive input from human-machine interface (HMI) controls 136 configured to provide for occupant interaction with the vehicle 102. For instance, the head unit controller 104 may interface with one or more buttons or other HMI controls configured to invoke functions on the head unit controller 104 (e.g., steering wheel audio buttons, a push-to-talk button, instrument panel controls, etc.). The head unit controller 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The head unit controller 104 may be further configured to communicate with other components of the vehicle 102 via one or more in-vehicle networks 142. The in-vehicle networks 142 may include one or more of a vehicle controller area network (CAN), an Ethernet network, and a media-oriented system transfer (MOST), as some examples. The in-vehicle networks 142 may allow the head unit controller 104 to communicate with other vehicle 102 systems, such as a telematics control unit 144 having an embedded modem 145, a global positioning system (GPS) module 146 configured to provide current vehicle 102 location and heading information, and various vehicle electronic control units (ECUs) 148 configured to cooperate with the head unit controller 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the head unit controller 104 over a first in-vehicle network 142-A, and the telematics control unit 144, GPS module 146, and vehicle ECUs 148 may communicate with the head unit controller 104 over a second in-vehicle network 142-B. In other examples, the head unit controller 104 may be connected to more or fewer in-vehicle networks 142. Additionally or alternately, one or more HMI controls 136 or other components may be connected to the head unit controller 104 via different in-vehicle networks 142 than shown, or directly without connection to an in-vehicle network 142.

The head unit controller 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the head unit controller 104. In many examples, the head unit controller 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the head unit controller 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

A communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the head unit controller 104 may be identified by the head unit controller 104 according to paired device data 160 maintained in the storage medium 112. The paired device data 160 may indicate, for example, the unique device identifiers of mobile devices 152 previously paired with the head unit controller 104 of the vehicle 102, such that the head unit controller 104 may automatically reconnected to the mobile devices 152 referenced in the paired device data 160 without user intervention.

When a mobile device 152 that supports network connectivity is paired with and connected to the head unit controller 104, the mobile device 152 may allow the head unit controller 104 to use the network connectivity of the device modem 158 to communicate over the communications network 156 with various remote computing devices. In one example, the head unit controller 104 may utilize a data-over-voice plan or data plan of the mobile device 152 to communicate information between the head unit controller 104 and the communications network 156. Additionally or alternately, the head unit controller 104 may utilize the telematics control unit 144 to communicate information between the head unit controller 104 and the communications network 156, without use of the communications facilities of the mobile device 152.

Similar to the head unit controller 104, the mobile device 152 may include one or more processors 164 configured to execute instructions of mobile applications 170 loaded to a memory 166 of the mobile device 152 from a storage medium 168 of the mobile device 152. In some examples, the mobile applications 170 may be configured to communicate with the head unit controller 104 via the wireless transceiver 154 and with various network services via the device modem 158.

A cloud server 162 may include various types of computing apparatus, such as a computer workstation, a server, a desktop computer, a virtual server instance executed by a mainframe server, or some other computing system and/or device. Similar to the head unit controller 104, the one or more devices of the cloud server 162 may include a memory on which computer-executable instructions may be maintained, where the instructions may be executable by one or more processors of the devices. As discussed in detail below, the cloud server 162 may be configured to provide various scheduling or other services to users of the system 100.

The head unit controller 104 may also include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile applications 170. In other examples, the mobile applications 170 that support communication with the device link interface 172 may access an application programming interface (API) of a shared or separate device link application core 174 to facilitate communication with the device link interface 172.

The integration of functionality provided by the device link interface 172 may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the head unit controller 104 via the in-vehicle networks 142. The device link interface 172 may further provide the mobile applications 170 with access to the vehicle display 138. An example of a device link interface 172 may be the SYNC APPLINK component of the SYNC system provided by The Ford Motor Company of Dearborn, Michigan Other examples of device link interfaces 172 may include MIRRORLINK, APPLE CARPLAY, and ANDROID AUTO.

A schedule assistant 176 may be an example of an application installed to the mobile device 152. The schedule assistant 176 may be programmed to access various sources of information, as well as to create or update a user's schedule and/or alarms based on the information.

For instance, the schedule assistant 176 may integrate with the vehicle 102 via the device link interface 172 to receive vehicle 102 information. In another example, the vehicle 102 may communicate with the schedule assistant 176 of the mobile device 152 over the communications network 156, with or without use of a server as an intermediary. Vehicle information may, accordingly, be made available to the schedule assistant 176 from the vehicle 102.

Additionally, the schedule assistant 176 may also integrate with one or more scheduling applications, and personal task managers. In an example, the schedule assistant 176 may have access to a user's calendaring application installed to the mobile device 152 or available over a connection to a cloud server 162 over the communications network 156.

Using information from the vehicle 102, the schedule assistant 176 may be programmed to integrate with the personal task manager or calendar to automatically generate new tasks, and/or set and modify alarms and reminders. In an example, the schedule assistant 176 may be programmed to generate tasks with alarms prior to the user's next commitment, or pull ahead wake-up alarms to give the user headroom to perform a detected urgent vehicle-related task avoiding major impacts due to the unpredictable issues such as flat tires, low fuel, low battery voltage, etc. The schedule assistant 176 may also be programmed to check traffic data to warn the user proactively to ensure that the user has sufficient time to plan for the event.

The schedule assistant 176 may be further programmed to operate according to a level of freedom. The level of freedom may include a plurality of different modes of operation that allow the schedule assistant 176 to vary the amount of control given to a user to manage the changes made by the schedule assistant 176. In an example, the level of freedom may allow the schedule assistant 176 to act in an independent mode in which the schedule assistant 176 automatically makes adjustments to the user's schedule, or in a confirmation mode in which the schedule assistant 176 requests confirmation of various actions from the user. Moreover, the schedule assistant 176 may be configurable to allow the user to select which events would activate operation of the schedule assistant 176.

Figure 2:
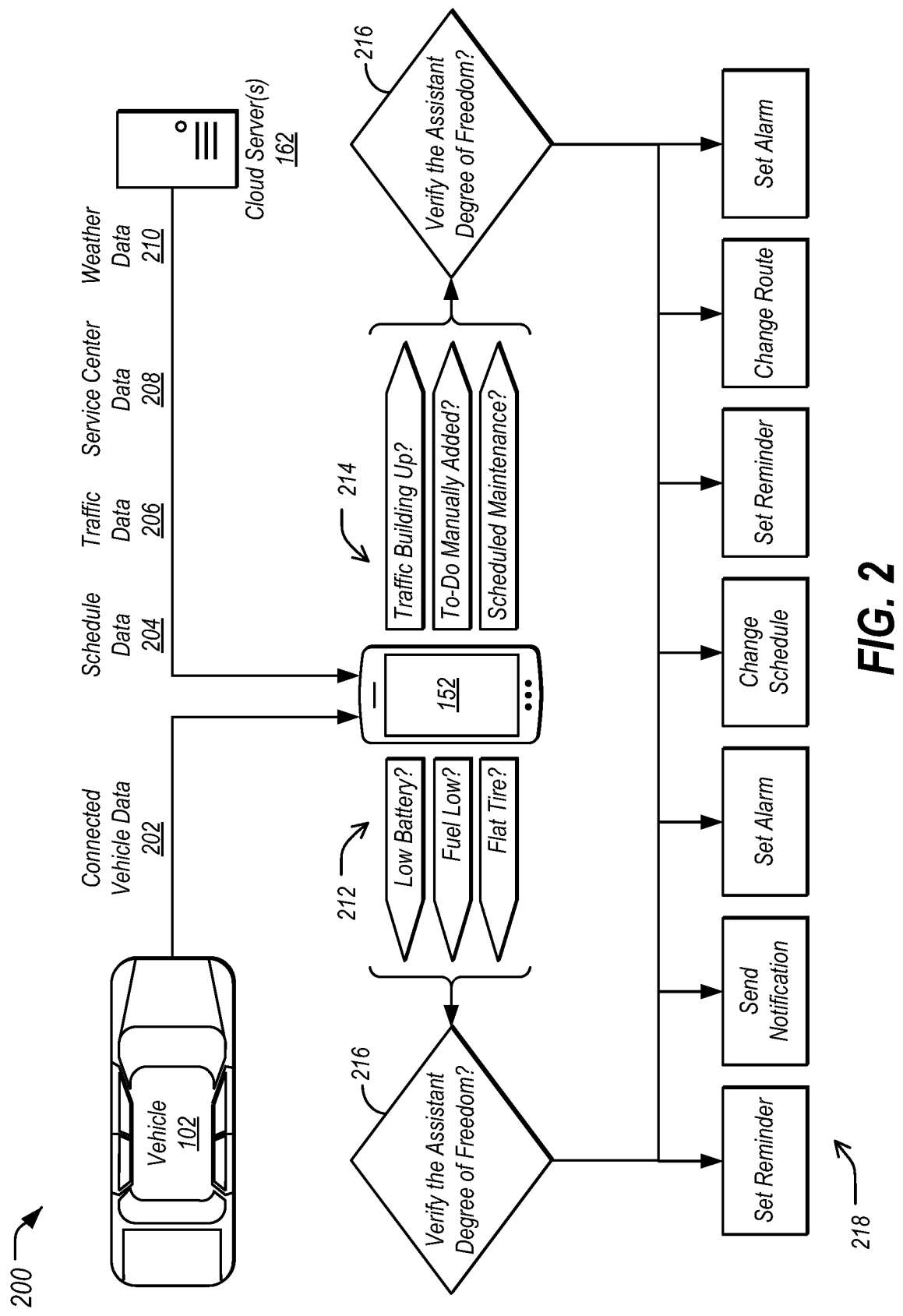
FIG. 2 illustrates an example data flow diagram for operation of the schedule assistant via the mobile device.

FIG. 2 illustrates an example data flow diagram 200 for operation of the schedule assistant 176 via the mobile device 152. As shown, the schedule assistant 176 of the mobile device 152 receives connected vehicle data 202 from the vehicle 102, and also receives schedule data 204, traffic data 206, service center data 208 and other types of data, typically from one or more cloud servers 162.

The connected vehicle data 202 may include information indicative of the status of the vehicle 102. This information may include, as some non-limiting examples, information indicative of tire pressure, fuel level, charge level, battery health, diagnostic faults detected by the vehicle 102, or oil life.

The schedule data 204 may include information indicative of appointments or other scheduled events for the user. In an example, the appointments may be associated with locations. In some cases, the scheduled events may be routine and not explicit in the calendar, such as arrival at work, or to pick up kids from school. Additionally or alternately, the schedule data 204 may include information indicative of alerts scheduled to remind the user at a particular time, or a particular amount of time before a scheduled event.

The traffic data 206 may include information regarding traffic flow along various roadways. In many examples, the traffic data 206 may be crowd-sourced from vehicles providing information about their speed and direction. The traffic data 206 may also include other information, such as data regarding planned road closures, or information regarding accidents.

The service center data 208 may include information regarding availability of service stations to address vehicle 102 issues. For instance, a dealership or auto shop may make available information regarding scheduling of vehicle 102 repairs. In another example, a charging station may make available occupancy information for scheduling electric vehicles to charge. In a further example, a fuel station may identify whether fuel is available, fuel price information, and/or an expected wait time to fill up.

The weather data 209 may include information regarding the weather conditions in the vicinity of the vehicle 102. In an example, the weather data 209 may include location information indicative of rain, snow, ice or other weather conditions may affect travel times for vehicles traversing the roadways. The weather data 209 may be made available via a cloud server 162 configured to distribute weather data 209. As some other possibilities, the weather data 209 may be collected locally by the mobile device 152, or even by the sensors of the vehicle 102.

These data elements may be utilized by the schedule assistant 176 to identify trigger events, which as some examples may be vehicle issues 212 and/or scheduling updates 214. The vehicle issues 212 may include conditions such as a low battery for the vehicle 102, a low fuel level for the vehicle 102, or a flat tire on the vehicle 102. The scheduling updates 214 may include issues such as traffic building up along a route to be traversed by the vehicle 102, weather conditions indicative of a potential or actual slowdown, a to-do item being manually added to a schedule for the user, or the occurrence of an indication for scheduled maintenance.

Responsive to identification of a vehicle issue 212 or a scheduling update 214, the schedule assistant 176 may verify the assistant degree of freedom 216. In an example, the degree of freedom may indicate that the mobile device 152 is to prompt the user for a responsive action 218 that is deemed necessary by the schedule assistant 176. In another example, the degree of freedom may indicate that the mobile device 152 is to issue a notification that a responsive action 218 has automatically been made by the schedule assistant 176. In yet another example, the degree of freedom may indicate that the mobile device 152 should silently make the responsive action 218.

Regarding the responsive action 218, the change may include one or more actions that, if performed, would mitigate the vehicle issue 212 or scheduling update 214 identified by the schedule assistant 176. As some examples, for a vehicle issue 212 the responsive action 218 may include setting an alarm for the user, sending a notification to the user, setting an alarm for the user, or adding or changing one or more appointments on the schedule of the user. As some other examples, for a scheduling update 214, the responsive action 218 may include setting an alarm, changing a route to be traversed by the vehicle 102, setting a reminder for the user, or adding or changing one or more appointments on the schedule of the user.

Figure 3:
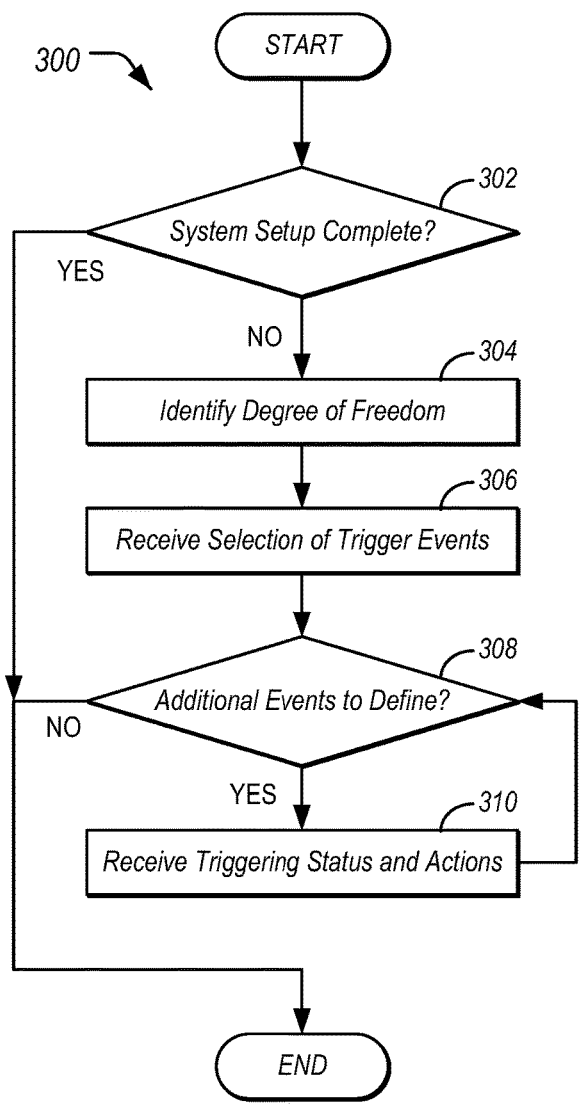
FIG. 3 illustrates an example process for configuration of trigger events for the schedule assistant.

FIG. 3 illustrates an example process 300 for configuration of trigger events for the schedule assistant 176. In an example, the process 300 may be performed by the schedule assistant 176 executed by the mobile device 152 in the context of the system 100.

At operation 302, the schedule assistant 176 determines whether system setup has been completed. In an example, if the schedule assistant 176 has not yet been executed, then the schedule assistant 176 may determine that system setup is incomplete. In another example, if the schedule assistant 176 receives user input to adjust system settings then the schedule assistant 176 may also determine that system setup is incomplete. If the system needs further setup, control passes to operation 304. If not, the process 300 ends.

At 304, the schedule assistant 176 identifies a degree of freedom. In an example, the schedule assistant 176 receives input from the user indicating a selection from one or more degrees of freedom. These may include, as some examples, selection from one or more of: to prompt the user for a responsive action 218 that is deemed necessary by the schedule assistant 176, that the mobile device 152 is to issue a notification that a responsive action 218 has automatically been made by the schedule assistant 176, or that the mobile device 152 should silently make the responsive action 218.

In another example, the schedule assistant 176 identifies the degree of freedom 216 based on other factors. For instance, the schedule assistant 176 may infer from other settings of the mobile device 152 that if the user sets other settings to automatic modes of operation then the schedule assistant 176 may default to automatic action rather than manual prompting. Or, the schedule assistant 176 may identify a correlation of the user's settings generally to desired degree of freedom 216, and use that correlation to suggest or default to a particular degree of freedom 216.

At 306, the schedule assistant 176 receives a selection of trigger events that are to be used as triggers for the schedule assistant 176. In an example, the schedule assistant 176 may provide a listing of one or more vehicle issues 212 and/or scheduling updates 214 that may be selected to be used as triggers. In some cases, the schedule assistant 176 may provide a default selection of trigger events from which the user may make adjustments.

The schedule assistant 176 determines at 308 whether there are selected trigger events to configure. If so, control passes to operation 310. If all the selected trigger events have been configured, then the process 300 ends.

At 310, the schedule assistant 176 receives a definition of the triggering status and actions for the trigger event being configured. The definition may include what conditions trigger a given event, such as a configurable level of tire pressure, fuel, battery, or time delay, as some possibilities. The definition may also include what responsive actions 218 to perform upon the occurrence of the condition, such as to set a reminder, create an alarm, display a popup, send a notification, adjust a route, perform charging, and so on. After operation 310, control returns to operation 308.

Figure 4:
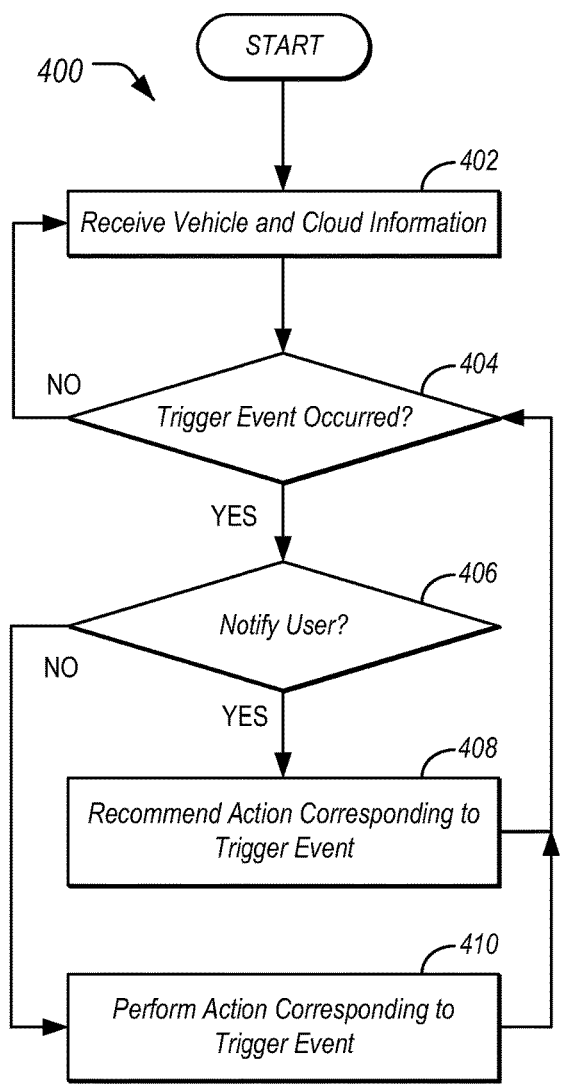
FIG. 4 illustrates an example process for the detection and handling of trigger events by the schedule assistant.

FIG. 4 illustrates an example process 400 for the detection and handling of trigger events by the schedule assistant 176. As with the process 300, the process 400 may for example be performed by the schedule assistant 176 executed by the mobile device 152 in the context of the system 100.

At operation 402, the schedule assistant 176 receives information. In an example, the schedule assistant 176 may receive connected vehicle data 202, schedule data 204, traffic data 206, service center data 208, or other data that may be useful in evaluating the occurrence of triggered events.

The schedule assistant 176 determines whether a trigger event occurred at 404. The conditions for the trigger events may have been set up beforehand, as discussed above with respect to the process 300. In an example, the schedule assistant 176 compares the received information to the conditions set up to trigger the given events. If an event is triggered, control passes to operation 406. If not, control returns to operation 402.

At 406, the schedule assistant 176 determines whether to notify the user of the responsive action 218 or automatically perform the responsive action 218. In an example, the schedule assistant 176 determines, from the established degree of freedom 216, whether the user should be notified of occurrence of the trigger event, or whether the schedule assistant 176 should automatically perform the responsive action 218 without prompting. If a recommendation is required, control passes to operation 408. If not, control passes to operation 410.

At operation 408, the schedule assistant 176 recommends a responsive action 218 corresponding to the triggered event. As some examples, the schedule assistant 176 may provide a prompt to the user suggesting an earlier departure time, a change in route, or to take the vehicle 102 in for service. After operation 408, control returns to operation 402.

At 410, the schedule assistant 176 automatically performs a responsive action 218 corresponding to the triggered event. As some examples, the schedule assistant 176 may automatically change a departure to an earlier departure time, automatically change a route, or automatically schedule the vehicle to be taken in for service. In cases where the degree of freedom 216 specifies to do so, the schedule assistant 176 may also notify the user of the occurrence of the automated responsive action 218. After operation 410, control returns to operation 402.

Accordingly, the described systems and methods improve upon existing personal assistants that are unable to change a user's schedule or to generate tasks based on connected vehicle data. Moreover, the described systems further improve upon existing personal assistants as the disclosed aspects facilitate notification or automatic performance of the responsive actions 218 based on a degree of freedom 216 specific to the user.

Computing devices described herein, such as the head unit controller 104 and mobile device 152, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a transceiver; and
a processor programmed to
receive, using the transceiver, information from a vehicle indicative of vehicle status and from a cloud service indicative of a user schedule,
responsive to occurrence of a predefined trigger event determined according to the information, update the user schedule corresponding to the trigger event and notify a user of the user schedule as updated in accordance with a degree of freedom setting, wherein the degree of freedom setting is automatically selected based on other user settings to the system of the same user inferring a general desired freedom preference preferred by the same user regardless of a context of the vehicle, the other user settings is unrelated to the predefined trigger event,
responsive to a user input modifying one of the other user settings indicative of a user intent to receive fewer notifications associated the one of the other user settings, increase the degree of freedom setting, and
responsive to reoccurrence of the predefined trigger event, update the user schedule corresponding to the trigger event without notifying the user in accordance with the increased degree of freedom.

2. The system of claim 1, wherein the degree of freedom indicates one of: (i) to prompt the user for the responsive action, (ii) to issue a notification that a responsive action has automatically been made by the processor, or (iii) to silently perform the responsive action.

3. The system of claim 1, wherein the processor is further programmed to identify the degree of freedom setting responsive to user selection of the degree of freedom.

4. The system of claim 1, wherein the information received from the vehicle includes information indicative of one or more of: tire pressure of the vehicle, fuel level of the vehicle, charge level of the vehicle, battery health of the vehicle, diagnostic faults detected by the vehicle, or oil life of the vehicle.

5. The system of claim 1, wherein the processor is further programmed to receive, from a cloud service, traffic data information regarding traffic flow along various roadways, the predefined trigger event is a delay in traffic along a route to be traversed by the vehicle, and the responsive action is to change a departure time in the user schedule for the vehicle to an earlier time.

6. The system of claim 1, wherein the processor is further programmed to receive, from a cloud service, service center data including information regarding availability of service stations to address vehicle issues, the predefined trigger event is an indication that service is required for the vehicle, and the responsive action is to update the user schedule with an available appointment at one of the service stations to service the vehicle.

7. The system of claim 1, wherein the processor is further programmed to:
receive selection of predefined trigger events to configure from a plurality of available trigger events; and
for each selected trigger event, receive a triggering status and a responsive action to perform corresponding to occurrence of the trigger event.

8. A method for a mobile device, comprising:
configuring, via a processor of the mobile device, trigger events with triggering statuses;
automatically assign, via the processor, a degree of freedom to a responsive action corresponding to each of the trigger events based on other user settings to the mobile device configured by a user inferring a general desired freedom preference preferred by the same user, the other user settings are unrelated to the trigger events;
adjust, via the processor, the degree of freedom responsive to detecting one or more user settings to the mobile device unrelated to the trigger events has changed, and
responsive to occurrence of one of the trigger events determined according to information from a vehicle or a cloud service meeting one of the triggering statuses, performing a responsive action to update a user schedule corresponding to the one of the trigger events and notifying a user of the action based on the degree of freedom.

9. The method of claim 8, further comprising receiving at least a portion of the information from the vehicle, wherein the information received from the vehicle is indicative of a vehicle status.

10. The method of claim 8, further comprising receiving at least a portion of the information from a cloud service, wherein the information received from the cloud service is indicative of traffic flow along a route to be traversed by the vehicle.

11. The method of claim 8, wherein the degree of freedom indicates one of: (i) to prompt the user for the responsive action, (ii) to issue a notification that a responsive action has automatically been made, or (iii) to silently perform the responsive action.

12. The method of claim 8, further comprising identifying the degree of freedom setting responsive to user selection of the degree of freedom.

13. A non-transitory computer-readable medium comprising instructions of a schedule application that, when executed by a processor of a mobile device, cause the mobile device to:
receive, using a transceiver of the mobile device, information from a vehicle indicative of vehicle status and from a cloud service indicative of a user schedule, and
responsive to occurrence of a predefined trigger event determined according to the information, update the user schedule corresponding to the trigger event and notify a user of the user schedule as updated in accordance with a degree of freedom setting, wherein the degree of freedom setting is automatically selected based on other user settings to the system of the same user inferring a general desired freedom preference preferred by the same user, the other user settings are unrelated to the trigger event,
responsive to a user input modifying one of the other user settings indicative of a user intent to receive more notifications associated the one of the other user settings, decrease the degree of freedom setting, and responsive to reoccurrence of the predefined trigger event, output a message to aske for a user confirmation to update the user schedule corresponding to the trigger event in accordance with the decreased degree of freedom.

14. The medium of claim 13, wherein the degree of freedom setting indicates one of: (i) to prompt the user for the responsive action, (ii) to issue a notification that a responsive action has automatically been made by the mobile device, or (iii) to silently perform the responsive action.

15. The medium of claim 13, further comprising instructions that, when executed by the processor of the mobile device, cause the mobile device to identify the degree of freedom setting responsive to user selection of the degree of freedom.

16. The medium of claim 13, wherein the information received from the vehicle includes information indicative of one or more of: tire pressure of the vehicle, fuel level of the vehicle, charge level of the vehicle, battery health of the vehicle, diagnostic faults detected by the vehicle, or oil life of the vehicle.

17. The medium of claim 13, further comprising instructions that, when executed by the processor of the mobile device, cause the mobile device to one or more of:
receive, from a cloud service, traffic data information regarding traffic flow along various roadways, the predefined trigger event is a delay in traffic along a route to be traversed by the vehicle, and the responsive action is to change a departure time in the user schedule for the vehicle to an earlier time; or
receive, from a cloud service, service center data including information regarding availability of service stations to address vehicle issues, the predefined trigger event is an indication that service is required for the vehicle, and the responsive action is to update the user schedule with an available appointment at one of the service stations to service the vehicle.

* * * * *